United States Patent
Carbonne et al.

(10) Patent No.: US 7,426,828 B2
(45) Date of Patent: Sep. 23, 2008

(54) METHOD AND DEVICE FOR CONTROLLING THE AIRFLOW SUPPLIED TO AN INTERNAL COMBUSTION ENGINE

(75) Inventors: Laure Carbonne, Toulouse (FR); Patrick Cremona, Mondouzil (FR); Roger Rouphael, L'Union (FR)

(73) Assignee: Continental Automotive France, Toulouse (FR)

( * ) Notice: Subject to any disclaimer, the term of this patent is extended or adjusted under 35 U.S.C. 154(b) by 10 days.

(21) Appl. No.: 10/555,318

(22) PCT Filed: Apr. 30, 2004

(86) PCT No.: PCT/EO2004/004592

§ 371 (c)(1),
(2), (4) Date: Jun. 6, 2006

(87) PCT Pub. No.: WO2004/099594

PCT Pub. Date: Nov. 18, 2004

(65) Prior Publication Data

US 2007/0022752 A1    Feb. 1, 2007

(30) Foreign Application Priority Data

May 6, 2003 (FR) .................................... 0305487

(51) Int. Cl.
*F02D 23/00* (2006.01)
*F02D 11/00* (2006.01)
*F02B 33/44* (2006.01)
*F02B 33/00* (2006.01)

(52) U.S. Cl. .................. 60/600; 60/602; 60/603; 60/605.1; 123/564; 123/399

(58) Field of Classification Search ........... 60/600–603, 60/605.1; 123/564, 339, 399
See application file for complete search history.

(56) References Cited

U.S. PATENT DOCUMENTS

| 4,697,421 | A | * | 10/1987 | Otobe et al. ............. 60/602 |
| 4,898,138 | A | * | 2/1990 | Nishimura et al. ........ 123/399 |
| 4,970,864 | A | * | 11/1990 | Kazuo et al. ............. 60/602 |
| 5,044,162 | A | * | 9/1991 | Kinoshita et al. ......... 60/602 |
| 5,083,434 | A | * | 1/1992 | Dahlgren et al. .......... 60/602 |

(Continued)

FOREIGN PATENT DOCUMENTS

| DE | 41 03 839 | 8/1992 |
| DE | 196 20 778 | 8/1997 |
| EP | 0 683 308 | 11/1995 |
| EP | 0 952 324 | 10/1999 |

*Primary Examiner*—Thai-Ba Trieu
(74) *Attorney, Agent, or Firm*—Young & Thompson

(57) ABSTRACT

This method is intended for a turbocharged internal combustion engine having an electrically controlled throttle valve. The turbocharger has a waste gate for regulating its pressure. The position of the valve and the extent to which the gate is open are controlled according to two distinct modes of operation. In the first mode, the position of the valve is predetermined as a function of engine control and operating parameters, and the position of the gate is used to regulate the air flow rate. In the second mode, the extent to which the gate is open is predetermined as a function of engine control and operating parameters, and the position of the valve is used to regulate the air flow rate. Which mode is used is gauged by an electronic device which chooses the mode of operation to be implemented as a function of predetermined conditions stored in memory.

4 Claims, 4 Drawing Sheets

U.S. PATENT DOCUMENTS

| | | | |
|---|---|---|---|
| 5,131,228 A * | 7/1992 | Mochizuki et al. | 60/602 |
| 5,289,683 A * | 3/1994 | Kurihara | 60/602 |
| 5,363,652 A * | 11/1994 | Tanaka et al. | 60/603 |
| 5,706,782 A * | 1/1998 | Kurihara | 123/399 |
| 5,850,738 A * | 12/1998 | Hayashi | 60/602 |
| 5,960,631 A * | 10/1999 | Hayashi | 60/602 |
| 6,058,706 A * | 5/2000 | Aschner et al. | 60/600 |
| 6,076,352 A * | 6/2000 | Hayashi | 60/602 |
| 6,244,050 B1 * | 6/2001 | Aschner et al. | 60/600 |
| 6,279,551 B1 * | 8/2001 | Iwano et al. | 123/564 |
| 6,553,301 B1 | 4/2003 | Chhaya et al. | 701/54 |

* cited by examiner

METHOD AND DEVICE FOR CONTROLLING THE AIRFLOW SUPPLIED TO AN INTERNAL COMBUSTION ENGINE

BACKGROUND OF THE INVENTION

The present invention relates to a method for managing the air flow rate through an internal combustion engine and to a corresponding device.

DESCRIPTION OF THE RELATED ART

Conventionally, the flow rate of air supplied to an engine is regulated using a throttle valve which allows the passage cross section in an air intake duct to be modified. This throttle valve is conventionally controlled using a cable connected, on the one hand, to a mechanism for controlling the opening and closing of the throttle valve and, on the other hand, to a throttle pedal. It is known practice for this cable to be replaced by an electrical control. A position sensor is then placed at the throttle pedal and the information supplied by the sensor is used, amongst other things, to control the opening and closing of the throttle valve. The latter is then controlled, for example, using an electrical actuator.

In a turbocharged engine, just as in a normally aspirated engine, there is a throttle valve regulating the flow rate of air supplied to the engine. Upstream of this throttle valve there is a heat exchange chamber known as an intercooler and supplied by a turbocharger turbine. Downstream of this throttle valve there is what is usually known as an intake manifold. In such an engine, the exhaust gases drive the turbocharger which compresses the air admitted to the engine at the heat exchange chamber. In order to avoid destructive excess pressure appearing in the engine air supply system, a turbocharger waste gate is provided. The latter is regulated as a function, in particular, of the pressures in the engine air supply system.

Turbocharged engines known at the present time do not have an electrically controlled throttle valve. In such engines, the opening of the throttle valve and the opening of the turbocharger waste gate would need to be regulated simultaneously. It can therefore be appreciated that, in such an engine, one of the parameters would be slaved to the other, and would be so permanently. It is thus possible to imagine, for example, the throttle pedal controlling the opening of the throttle valve and a regulating system acting on the turbocharger waste gate as a function of the pressures in the engine air inlet system. This is how turbocharged engines currently operate. It is also possible here to imagine the action of the user on the throttle pedal acting on the turbocharger waste gate. The position of the throttle valve would then be slaved to the opening of the turbocharger waste gate.

SUMMARY OF THE INVENTION

It is therefore an object of the present invention to provide a method that allows the flow rate of air through a turbocharged engine comprising an electric throttle valve to be managed, this method making it possible to solve the problems of balance in the regulating of the opening of the throttle valve and of the turbocharger waste gate, and to manage the two degrees of freedom in the regulation of the air of such an engine.

To this end, the invention proposes a method for managing the air flow rate through an internal combustion engine comprising, on the one hand, a throttle valve placed in an air inlet duct that admits air into the engine so as to regulate the cross section for the passage of air through this duct, and which is electrically controlled, and, on the other hand, a turbocharger, driven by exhaust gases and, under certain conditions, compressing the air admitted to the engine, the turbocharger being equipped with a waste gate for regulating its pressure, and a throttle pedal used as a control for making demands of the engine.

According to the present invention, the position of the throttle valve and the opening of the waste gate are controlled using two distinct modes of operation; in the first mode of operation the position of the throttle valve is predetermined as a function of engine control and operating parameters and the position of the waste gate regulates the airflow; in the second mode of operation the opening of the waste gate is predetermined as a function of engine control and operating parameters and the position of the throttle valve regulates the airflow, and an electronic device gauges which of the two modes of operation is to be implemented and chooses that mode of operation as a function of predetermined conditions stored in memory.

In that way, it is possible to favor one or other of the actuators (throttle valve or waste gate) as a function of the engine parameters and demands on the engine. Regulation is done in a balanced way. There are no contradictions between the commands sent to the throttle valve and those sent to the turbocharger waste gate. This management method allows good control over the two degrees of freedom that there are in a turbocharged engine equipped with an electrically controlled throttle valve.

In a management method according to the invention, the position of the throttle pedal is interpreted for example as a request for an air flow rate through the engine. It is equivalent here to consider that this request is a request for pressure because, under given conditions, one and only one air pressure corresponds to one air flow rate.

In the first mode of operation, the position of the throttle valve is predetermined particularly as a function of parameters such as the engine load and speed, and the opening of the waste gate is preferably preset in open loop and regulated as a function of the air flow rate request and the air flow rate measured. This mode of operation is used, for example, under full load. The throttle valve is then preferably in an open position and the air flow rate through the engine is regulated by the waste gate.

In the second mode of operation, the opening of the waste gate is predetermined particularly as a function of parameters such as, for example, the engine speed and the external atmospheric pressure; the position of the throttle valve is regulated so as to obtain the required air flow rate through the engine. This mode of operation is used, for example, below a predetermined speed, the waste gate then being opened and the air flow rate being regulated using the position of the throttle valve.

In a method according to the invention, it may be planned that, for a predetermined range of speeds and a position of the throttle pedal short of a predetermined position, the throttle valve remains closed short of a predetermined degree of opening so as to create a pressure differential across the throttle valve.

In one preferred embodiment, the throttle valve is more or less in the open position under full load and the turbocharger waste gate is then regulated in such a way as to supply the engine at the maximum pressure.

The present invention also relates to a device for managing the air flow rate in an internal combustion engine comprising, on the one hand, a throttle valve placed in an air inlet duct that admits air into the engine so as to regulate the cross section for the passage of air through this duct, and which is electrically controlled, and, on the other hand, a turbocharger, driven by exhaust gases and, under certain conditions, compressing the air admitted to the engine, the turbocharger being equipped with a waste gate for regulating its pressure, and a throttle pedal used as a control for making demands to the engine, characterized in that it comprises:

a first regulating device controlling the position of the throttle valve so as to operate the throttle valve in such a way as to obtain an air flow rate corresponding to a setpoint value, a second regulating device controlling the opening of the waste gate so as to operate the latter in such a way as to obtain an air flow rate corresponding to a setpoint value, control means for bringing the throttle valve into a predetermined position, means for opening the waste gate to a predetermined extent, and a gauging device comprising a memory in which a table is recorded that determines, as a function of parameters, particularly the engine load and speed, which regulating device it is that is to regulate the air flow rate, and any prepositioning there might be of the throttle valve and/or of the waste gate.

A device such as this allows the method described above to be implemented.

In one advantageous embodiment, several tables are stored in the gauging device and selection means allow the table used for engine management to be chosen. These selection means comprise, for example, a manual selector. The driver can then choose which table he wants to use and thus determine the behavior of his engine. It is also possible to anticipate the selection means comprising learning means able to evaluate the driving style of the driver, and associated with automatic means of selection so as to select a table according to the driver's driving style.

BRIEF DESCRIPTION OF THE DRAWINGS

Details and advantages of the present invention will become better apparent from the description which follows, given with reference to the attached schematic drawing in which.

DESCRIPTION OF THE PREFERRED EMBODIMENTS

Figure 1:
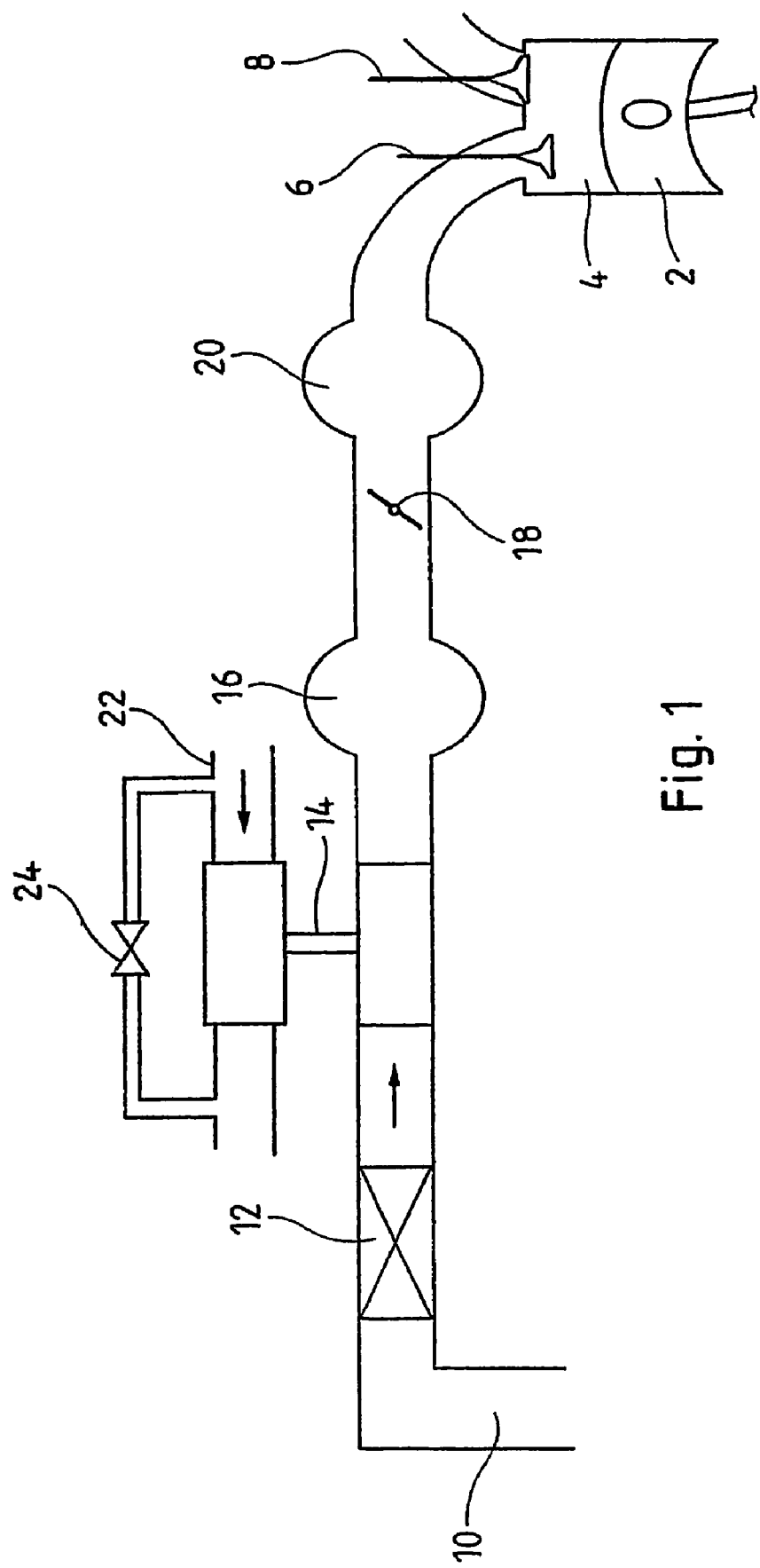
FIG. 1 schematically depicts an air supply system of a turbocharged engine.

FIG. 1 very schematically depicts an air supply system of a turbocharged engine. To the right in this figure, that is to say downstream of the supply system depicted, is shown a piston 2 able to move in a cylinder 4. A valve 6 controls the admission of air to the cylinder 4. A valve 8 for its part is provided for exhausting the burnt gases from the cylinder 4. The corresponding engine comprises, for example, several cylinders and the supply system depicted is common to all the cylinders or to some of these.

This air supply system comprises, working toward the downstream end, an air inlet 10, an air mass flowmeter 12, a turbocharger 14, a heat exchange chamber known as an intercooler 16, a throttle valve 18 positioned in a duct through which the air supplied to the cylinders passes and able to influence the airflow cross section of this duct, and what is known as an intake manifold 20. The intake valves 6 communicate directly with the intake manifold 20.

As is known per se, the air mass flow meter 12 may be replaced by a pressure sensor from which the flow rate would then be calculated rather than measured.

The turbocharger 14 comprises two turbines connected via a shaft. A first turbine is positioned in an exhaust duct 22 and its rotation is driven by the burnt gases leaving the cylinders 4 via the exhaust valves 8. The second turbine, as mentioned above, is positioned in the engine air supply system and pressurizes the air in the heat exchange chamber 16. In the conventional way, a turbocharger waste gate 24 allows the turbine positioned in the exhaust duct 22 to be short-circuited.

Such a structure is commonplace in a turbocharged engine. The present invention relates to an engine equipped with an intake system of this type in which the position of the throttle valve 18 is controlled electrically. In this case, in order to manage the air flow rate through the engine, it is necessary to regulate both the angle of opening of the throttle valve 18 and the opening of the turbocharger waste gate 24. The difficulty here lies in the addition, into a stable system for monitoring the air flow rate and/or pressure that a turbocharged engine air intake system of the prior art constitutes, of a further air actuator (the electrically controlled throttle valve 18) with its own closed-loop control and its own dynamic range which differs from that of the turbocharger waste gate 24. Hitherto, electrically controlled throttle valves have been used only on normally aspirated vehicles. The system for pivoting the throttle valve to vary its angle of opening is based on an air flow rate (or pressure) request measured at the throttle peddle. The use of an electrically controlled throttle valve in an engine equipped with a controlled turbocharger entails simultaneous control of the throttle valve and of the turbocharger because the two control devices are independent, being based on one and the same air flow rate (or pressure) setpoint value and have a similar level of influence over this air management. Controlling the throttle valve and the turbocharger is also made difficult by the differences in response times between the throttle valve and the turbocharger waste gate. This can then lead to instabilities in the control of the air flow rate (or pressure) in the engine air supply system. Such an instability then causes shortening of the ignition advance.

The method hereinafter allows these problems which cause pollution and impaired drivability to be solved.

Figure 2:
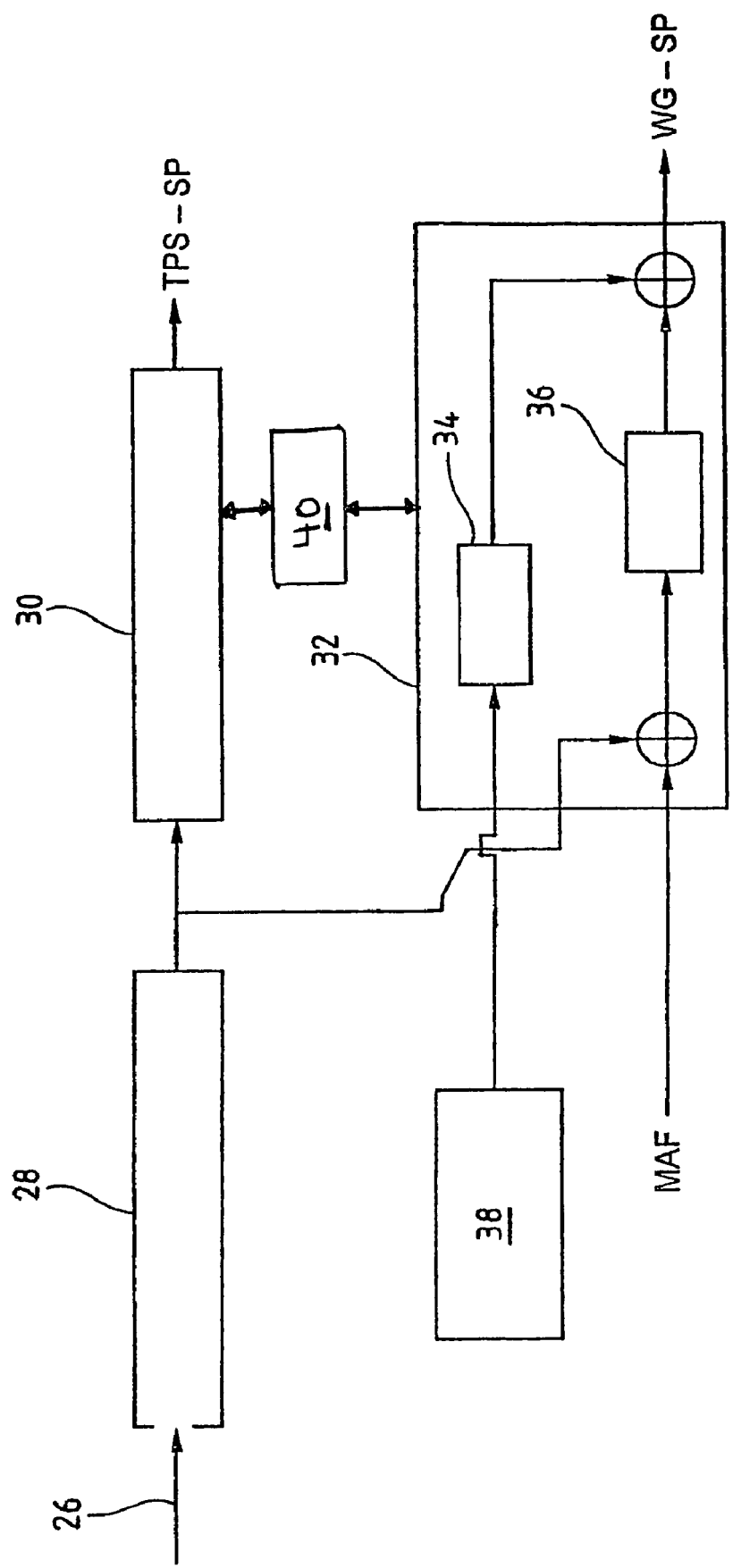
FIG. 2 is a diagram in the form of a flow chart illustrating the method according to the invention.

FIG. 2 shows schematically in the form of a flow diagram a method according to the invention. In this flow diagram, an arrow 26 symbolizes a command received from a throttle pedal of the corresponding vehicle. As indicated above, the throttle valve 18 is electrically controlled. The throttle pedal and the throttle valve 18 are therefore not mechanically connected as is still the case with some throttles.

The position of the throttle pedal is measured using a sensor, and an interpretation device 28 translates the information received via the throttle pedal into an air flow rate setpoint value. This position of the throttle pedal may also be translated as an air pressure request. These requests are more or less equivalent in that, under given conditions, one and only one air pressure corresponds to one air flow rate. The remainder of the description will deal only with air flow rates but, as specified hereinabove, air pressures may also be involved.

The engine management and control device comprises, on the one hand, means for calculating the opening of the throttle valve 30 and, on the other hand, means for calculating the opening of the turbocharger waste gate 32.

The means for calculating the opening of the throttle valve 30 are, for example, means of a type known to those skilled in the art. Thus, for example, the air flow rate request supplied by the interpretation device 28 is translated in terms of passage cross section and therefore of angle of opening of the throttle valve 18. The air flow rate at the throttle valve 18 depends not only on the passage cross-sectional area left free at this throttle valve 18 but also on the pressure difference between the heat exchange chamber 16 and the intake manifold 20. Knowledge of this pressure difference and of the air flow rate request allows the means for calculating the opening of the throttle valve 30 to provide an angle of opening for the throttle valve 18, termed TPS-SP in FIG. 2.

The means for calculation of the opening of the turbocharger waste gate 32 may also be known means. They comprise for example precontrol means 34 which, in open loop, calculate a "pre-position" of the turbocharger waste gate 24. A corrective term is added to this pre-position calculated in open loop. The required air flow rate defined by the interpretation device 28 is then compared with the mass air flow rate (MAF) measured by the flow meter 12 or calculated. A control/matching device 36 then calculates a corrective term that is added to the term calculated by the precontrol means 34. By summing these two terms, the means for calculating the position of the turbocharger waste gate 32 supply a setpoint value to the turbocharger waste gate 24, this setpoint value being termed WG-SP in FIG. 2.

The engine management and control device according to the invention comprises means for calculating the opening of the throttle valve 30 and means for calculating the opening of the turbocharger waste gate 32 but it also comprises means 40 gauging the priority to be given either to the throttle valve 18 or to the turbocharger waste gate 24. These gauging means make it possible to determine whether the throttle valve 18 is slaved to the turbocharger 14 or vice versa. If the throttle valve 18 is slaved to the turbocharger 14, the air flow rate request received at the throttle pedal is used to regulate the turbocharger waste gate 24 and the throttle valve 18 is used to regulate the airflow as a function of the position of the waste gate WG-SP calculated as a function of the required flow rate. By contrast, if the turbocharger 14 is slaved to the throttle valve 18, the air flow rate request at the throttle pedal is translated into an angle of opening of the throttle valve 18 and the turbocharger waste gate 24 then regulates the air flow rate.

The gauging device thus allows priority to be given either to the throttle valve 18 or to the engine turbocharger 14. Priority is then given either to the performance afforded by the engine, or fuel consumption thereof. The engine management and control device therefore, as a function of certain parameters (for example engine speed and engine load), plans whether priority is to be given to the throttle valve 18 or to the turbocharger 14.

By way of example, it is possible, for example, to consider a four-cylinder engine with a cylinder capacity of 1800 cc. It is assumed that this engine has a range of speeds of between 0 and 6200 rpm. For this engine it is possible, for example, to define three main zones:

Start-up zone: in this instance, the electric throttle valve is the master. This zone relates to engine speeds lying between low idle (for example about 800 rpm) and 1500 rpm. At these speeds, the turbocharger 14 cannot in any event be enabled because the air flow rates are low. The pressure in the intake manifold 20 is then between 800 and 1000 mbar (1 mbar approximately equal to 1 hPa). The throttle pedal therefore in this zone controls the position of the electric throttle valve.

Part-load zone: the speeds here range between 1500 and 6200 rpm but for a throttle pedal position short of a predetermined position. In this zone, the pressure in the intake manifold 20 is below 1000 mbar but the pressure in the heat exchange chamber 16, before the throttle valve 18, may adopt values ranging up to 1800 mbar. In this zone, the turbocharger 14 is in action but the electric throttle valve is not open very wide so that a relatively high pressure difference is created between the intake manifold 20 and the heat exchange chamber 16. This pressure difference, which could, for example, be known as "power reserve", will allow the driver, when he needs to accelerate by depressing the throttle pedal, to supercharge the engine without delay. What happens is that it is enough to bring the throttle valve 18 into a wide open throttle position for the pressures in the intake manifold 20 and the heat exchange chamber 16 to equalize and for a high pressure to be present in the manifold at the intake valves 6.

Full-load zone: this zone also relates to engine speeds of between 1500 and 6200 rpm. However, here, the throttle pedal is beyond the previously predetermined position. In this zone, it is possible to choose to place the throttle valve 18 in the wide open throttle position and the air supply is then managed directly by the turbocharger via the turbocharger waste gate 24. Pressures ranging up to 1600 or 1800 mbar upstream and downstream of the electric throttle valve 18 are again seen here.

In the above example, it is found that, under full load, regulation is provided by the turbocharger alone. Thus, in FIG. 2, a maximum pressure regulating device 38 is provided. This device, under full load, controls the maximum pressure that the engine can admit. Control of the turbocharger, and therefore of the turbocharger waste gate 24, is thus dissociated from control of the throttle valve 18 by accepting different respective air flow rates at the throttle valve 18 and at the turbocharger 14. In order then to avoid shortening of the ignition advance, it is possible to introduce into the engine management logic a band in which shortenings of the advance are deactivated so as not to limit the dynamic range of the turbocharger.

Figure 3:
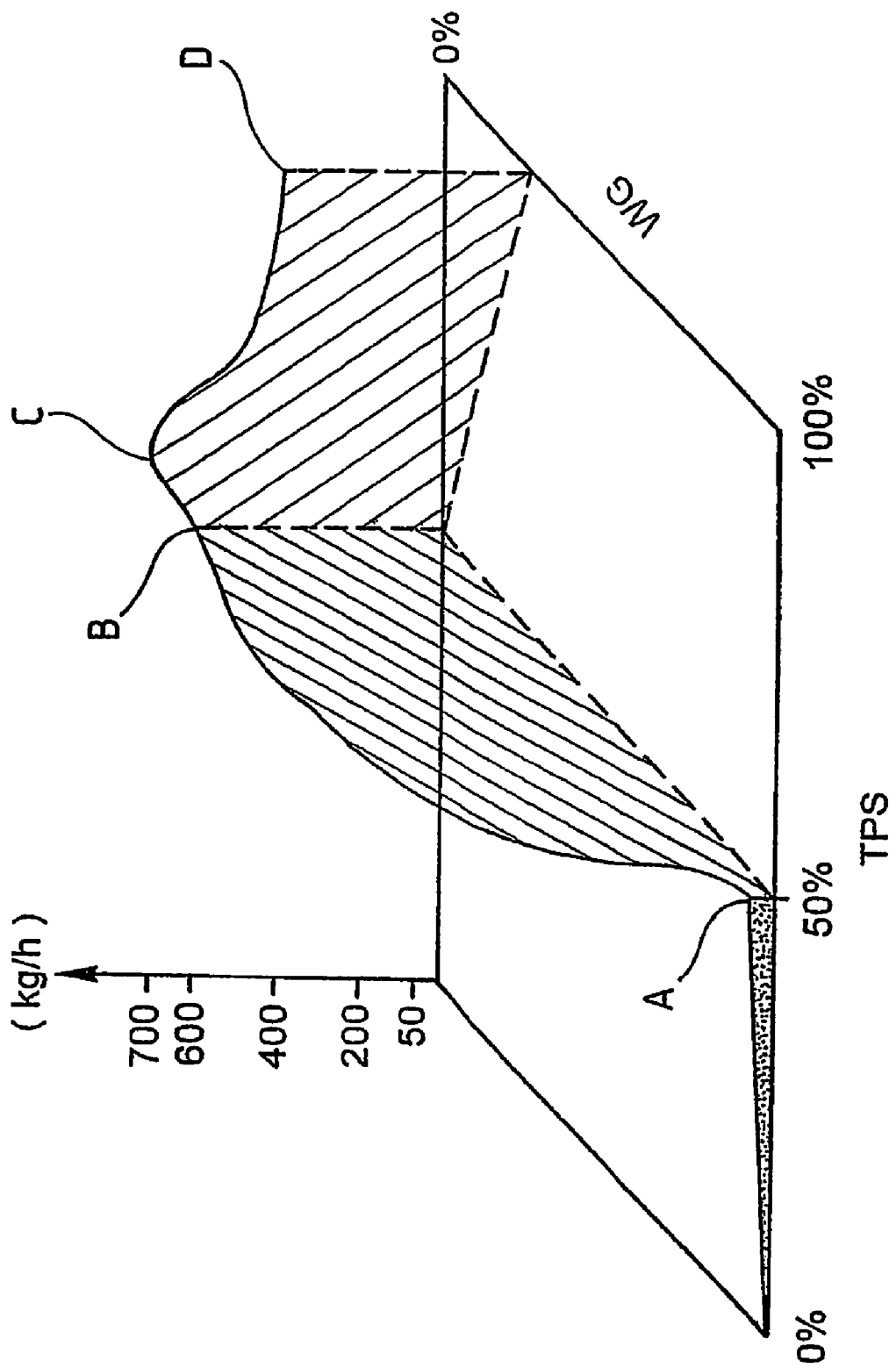
FIGS. 3 and 4 are three-dimensional depictions illustrating examples of the application of the method according to the invention.
Figure 4:
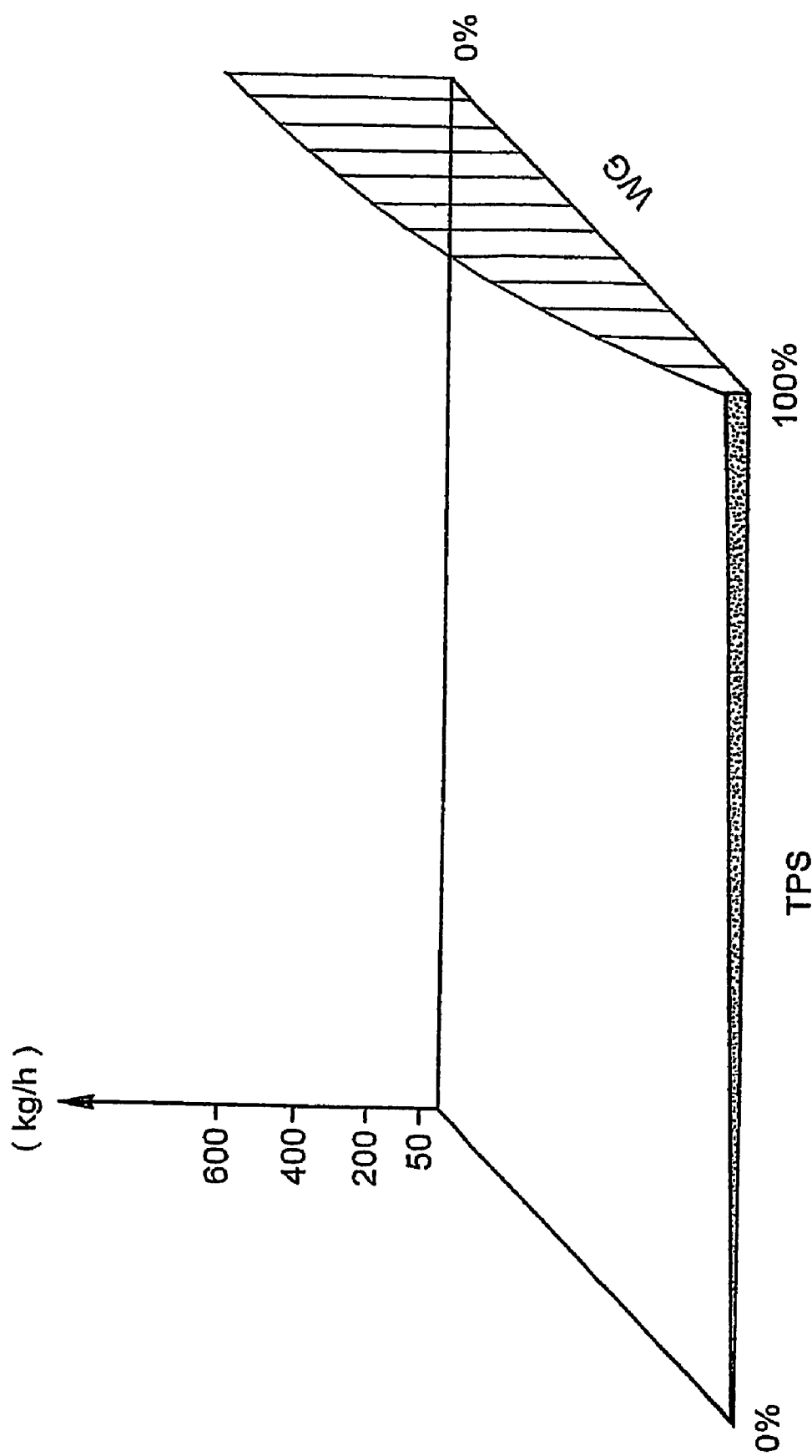

FIGS. 3 and 4 illustrate, by way of example, the operation of an engine in which the air flow rate is regulated sometimes using the throttle valve 18 and sometimes using the turbocharger waste gate 24.

FIGS. 3 and 4 each provide a three-dimensional depiction in which a first axis corresponds to the opening of the throttle valve 18, a second axis corresponds to the opening of the turbocharger waste gate 24 and the third (vertical) axis corresponds to the air mass flow rate in the engine, measured using the flowmeter 12. The abbreviation used in these figures for the throttle valve 18 is TPS while the turbocharger waste gate 24 is abbreviated to WG.

In FIG. 3, the starting point is a position in which the throttle valve 18 is closed (TPS=0%) and the turbocharger waste gate is open (WG=100%). At low speed the air flow rate remains low. The turbocharger does not come into action and the turbocharger waste gate 24 remains wide open. Only the position of the throttle valve 18 varies. Here it is assumed that the command provided by the throttle pedal acts on the throttle valve 18 until the latter is half open (TPS=50%). This then gives point A which has the following values: TPS=50%, WG=100% and the mass flow rate is 50 kg/h. It is considered that, from this flow rate upwards and for this given engine, the turbocharger 14 is able to provide a boost pressure.

The position of the throttle valve 18 is then locked by the engine management and control device according to the invention. It is assumed that the request at the throttle pedal continues demanding an increasingly high air flow rate. The turbocharger waste gate 24 will thus gradually close. The exhaust gases therefore drive the turbocharger 14 which raises the pressure in the heat exchange chamber 16. This increase in pressure will quickly cause an increase in the flow rate and in the engine speed. This then brings us to point B where a throttle valve 18 is still half open but the turbocharger waste gate 24 is fully closed. The coordinates of this point B are then: TPS=50%, WG=0% and the mass flow rate is 600 kg/h. The turbocharger 14 here is working at full boost. As the throttle valve 18 is partially closed, there is a raised pressure in the heat exchange chamber 16 upstream of the throttle valve 18 by comparison with the pressure in the intake manifold 20 upstream of this throttle valve 18. Here there is a "power reserve" as mentioned earlier. From point B onwards, the throttle valve 18 opens. The pressure in the intake manifold 20 increases quickly, making it possible to increase the air flow rate further. This brings us to point C where the mass flow rate has a maximum value, 700 kg/h for example. Of course, this situation cannot be sustained unless the engine is capable of enduring such high levels of boost without sustaining damage. In order to limit the raised pressures and avoid damaging the engine, such situations are limited over time. As indicated in FIG. 3, in order to limit the boost pressure, the turbocharger waste gate 24 is partially opened. There is therefore, in parallel with the opening of the throttle valve 18, an opening of the waste gate 24 which is manifested in FIG. 3 by a skewing with respect to the coordinate axes. When the throttle valve is open (point D) there is a mass flow rate more or less equal to the mass flow rate at point B again. For example, in this instance, we have the following values: TPS=100% and WG=20%, the mass flow rate here being 600 kg/h.

In this example, between points A and B, it was assumed that the position of the throttle valve remained fixed at an opening corresponding to 50% of the cross section of the duct. In order to increase the "power reserve" it is possible to envisage reducing the opening of the throttle valve so as to arrive for example at a point B' (not depicted) for which, for example, we would have TPS=35% and WG=0%.

As is apparent from the foregoing description, the engine management and control device makes it possible to have and to manage a "power reserve". By acting both on the turbocharger waste gate 24 and the opening of the throttle valve 18 it is possible, once point C has been exceeded, to redevelop a "power reserve" without in any way losing out in terms of engine power by comparison with a turbocharged engine that does not allow for a "power reserve".

FIG. 4 illustrates an entirely different mode of operation. The logic here is simpler. At low speed, and therefore at low flow rate, only the position of the throttle valve varies. Once the throttle valve is wide open (TPS=100%) and the flow rate (for example 50 kg/h) is high enough for the turbocharger to be able to deliver boost, the acceleration is provided simply by acting on the turbocharger waste gate 24 by closing the latter.

The device described hereinabove and the associated method therefore make it possible to manage, on the same engine, a turbocharger waste gate and an electric throttle valve. According to predetermined operating ranges, it is either the turbocharger waste gate or the throttle valve which is the master. These zones can be defined in various ways using parameters such as: engine speed, engine load, pressures or pressure differences within the engine, etc.

It is thus possible with one and the same engine to obtain entirely different types of behavior. Programming the engine management and control device will make it possible to obtain an economical engine, another setting will make it possible to obtain a hotted-up engine, yet another will make it possible to obtain a very responsive engine, etc. Of course, it is equally possible to envisage leaving a driver to choose what style of driving he wishes to adopt. A selector then allows him to choose between several preprogrammed modes. It is even conceivable to associate an engine management and control device according to the invention with a learning device which then allows the engine behavior to be adapted to the driving style of the driver.

The present invention is not restricted to the methods and devices described hereinabove by way of nonlimiting examples. It also covers all embodiment variants that are within the competence of the person skilled in the art within the scope of the claims that follow.

The invention claimed is:

1. A method for managing the air flow rate through an internal combustion engine, comprising the steps of:
   i) operating an electrically controlled throttle valve (18) placed in an air inlet duct to admit air into the engine so as to regulate, by a degree of opening of the throttle valve, a cross section for a passage of air through the air inlet duct,
   ii) with a waste gate (24), regulating pressure of a turbocharger (14) driven by exhaust gases and compressing the air admitted to the engine,
   iii) using a throttle pedal to issue a command to control output of the engine, and
   iv) with an electronic device, gauging a priority to be given to the throttle valve or to the turbocharger so as to respond to the command issued by the throttle pedal, wherein,
   for an engine loading zone defined by a current engine speed being within a predetermined range of engine speeds and also the throttle pedal currently being depressed to a position short of a predetermined position, the throttle valve (18) is purposely positioned short of a predetermined degree of opening so as to create a pressure differential across the throttle valve (18) with a heat exchange chamber pressure upstream of the throttle valve being higher than an intake manifold pressure downstream of the throttle valve so that the created pressure differential across the throttle valve (18) provides a power reserve such that depressing the throttle pedal, into a wide open position, supercharges the engine without delay by the intake manifold pressure and the heat exchange chamber pressure equalizing,
   the predetermined range of engine speeds is between 1500 and 6200 rpm,
   the engine is defined to operate in i) a part-load zone with engine speeds ranging between 1500 and 6200 rpm, the throttle pedal position short of the predetermined position, and turbocharger in action, and ii) a full-load zone with engine speeds ranging between 1500 and 6200 rpm, the throttle pedal beyond the predetermined position, and the turbocharger being the master,
   in the part-load zone, the intake manifold pressure is below 1000 mbar and the heat exchange chamber pressure has values greater than 1000 mbar and ranging up to 1800 mbar, and the throttle valve maintained partially open so that a pressure difference is created between the intake manifold and the heat exchange chamber to provide the power reserve such that depressing the throttle pedal, into the wide open position, supercharges the engine without delay by the intake manifold pressure and the heat exchange chamber pressure equalizing, and
   in the full-load zone, the pressure in the intake manifold ranges up to 1800 mbar.

2. A method for managing the air flow rate through an internal combustion engine, comprising the steps of:

i) operating an electrically controlled throttle valve (18) placed in an air inlet duct to admit air into the engine so as to regulate, by a degree of opening of the throttle valve, a cross section for a passage of air through the air inlet duct;

ii) with a waste gate (24), regulating pressure of a turbocharger (14) driven by exhaust gases and compressing the air admitted to the engine;

iii) using a throttle pedal to issue a command to control output of the engine; and iv) with an electronic device, gauging a priority to be given to the throttle valve or to the turbocharger so as to respond to the command issued by the throttle pedal, wherein, for an engine loading zone defined by a current engine speed being within a predetermined range of engine speeds and also the throttle pedal currently being depressed to a position short of a predetermined position, the throttle valve (18) is purposely positioned short of a predetermined degree of opening so as to create a pressure differential across the throttle valve (18) with a heat exchange chamber pressure upstream of the throttle valve being higher than an intake manifold pressure downstream of the throttle valve so that the created pressure differential across the throttle valve (18) provides a power reserve such that depressing the throttle pedal, into a wide open position, supercharges the engine without delay by the intake manifold pressure and the heat exchange chamber pressure equalizing, the predetermined range of engine speeds is between 1500 and 6200 rpm, the engine is defined to operate in three main zones, the three zones being 1) a startup zone with engine speeds ranging up to 1500 rpm, 2) a part-load zone with engine speeds ranging between 1500 and 6200 rpm, and 3) and a full-load zone with engine speeds ranging between 1500 and 6200 rpm, in the startup zone, the throttle valve is the master and the turbocharger cannot be enabled, in the part-load zone, the turbocharger is in action, the throttle pedal position is short of the predetermined position, the intake manifold pressure is below 1000 mbar and the heat exchange chamber pressure has values greater than 1000 mbar and ranging up to 1800 mbar, and the throttle valve partially opens so that a pressure difference is created between the intake manifold and the heat exchange chamber to provide the power reserve such that depressing the throttle pedal, into the wide open position, supercharges the engine without delay by the intake manifold pressure and the heat exchange chamber pressure equalizing, and in the full-load zone, the throttle pedal is beyond the predetermined position and the pressure in the intake manifold ranges up to 1800 mbar, and the turbocharger is the master.

3. A device for managing the air flow rate in an internal combustion engine comprising, on the one hand, a throttle valve (18) placed in an air inlet duct that admits air into the engine so as to regulate the cross section for the passage of air through the air inlet duct, and which is electrically controlled, and, on the other hand, a turbocharger (14), driven by exhaust gases and compressing the air admitted to the engine, the turbocharger (14) being equipped with a waste gate (24) for regulating pressure of the turbocharger, and a throttle pedal used as a control for controlling output of the engine, said device comprising:

a first regulating device (30) controlling the position of the throttle valve (18) so as to operate the throttle valve in such a way as to obtain an air flow rate corresponding to a setpoint value, a second regulating device (32) controlling the opening of the waste gate (24) 50 as to operate the latter in such a way as to obtain an air flow rate corresponding to a setpoint value, control means for bringing the throttle valve (18) into a predetermined position, means for opening the waste gate (24) to a predetermined position, and a gauging device comprising a memory in which a table is recorded that determines, as a function of parameters, particularly the engine load and speed, which regulating device of the first and second regulating devices is to regulate the air flow rate, wherein, for an engine loading zone defined by a current engine speed being within a predetermined range of engine speeds and also the throttle pedal currently being depressed to a position short of a predetermined position, the throttle valve (18) is purposely positioned short of a predetermined degree of opening so as to create a pressure differential across the throttle valve (18) with a heat exchange chamber pressure upstream of the throttle valve being higher than an intake manifold pressure downstream of the throttle valve so that the created pressure differential across the throttle valve (18) provides a power reserve such that depressing the throttle pedal, into a wide open position, supercharges the engine without delay by the intake manifold pressure and the heat exchange chamber pressure equalizing, the predetermined range of engine speeds is between 1500 and 6200 rpm, the engine is defined to operate in i) a part-load zone with engine speeds ranging between 1500 and 6200 rpm, the throttle pedal position short of the predetermined position, and turbocharger in action, and ii) a full-load zone with engine speeds ranging between 1500 and 6200 rpm, the throttle pedal beyond the predetermined position, and the turbocharger being the master, in the part-load zone, the intake manifold pressure is below 1000 mbar and the heat exchange chamber pressure has values greater than 1000 mbar and ranging up to 1800 mbar, and the throttle valve maintained partially open so that a pressure difference is created between the intake manifold and the heat exchange chamber to provide the power reserve such that depressing the throttle pedal, into the wide open position, supercharges the engine without delay by the intake manifold pressure and the heat exchange chamber pressure equalizing, and in the full-load zone, the pressure in the intake manifold ranges up to 1800 mbar.

4. A device for managing the air flow rate in an internal combustion engine comprising, on the one hand, a throttle valve (18) placed in an air inlet duct that admits air into the engine so as to regulate the cross section for the passage of air through the air inlet duct, and which is electrically controlled, and, on the other hand, a turbocharger (14), driven by exhaust gases and compressing the air admitted to the engine, the turbocharger (14) being equipped with a waste gate (24) for regulating pressure of the turbocharger, and a throttle pedal used as a control for controlling output of the engine, said device comprising:

a first regulating device (30) controlling the position of the throttle valve (18) so as to operate the throttle valve in such a way as to obtain an air flow rate corresponding to a setpoint value, a second regulating device (32) controlling the opening of the waste gate (24) so as to operate the latter in such a way as to obtain an air flow rate corresponding to a setpoint value, control means for bringing the throttle valve (18) into a predetermined position, means for opening the waste gate (24) to a predetermined position, and a gauging device comprising a memory in which a table is recorded that determines, as a function of parameters, particularly the engine load and speed, which regulating device of the first and second regulating devices is to regulate the air flow rate, wherein, the predetermined range of engine speeds is between 1500 and 6200 rpm, the engine is defined to operate in three main zones, the three zones being 1) a start-up zone with engine speeds ranging up to 1500 rpm, 2) a part-load zone with engine speeds ranging between 1500 and 6200 rpm, and 3) and a full-load zone with engine speeds ranging between 1500 and 6200 rpm, in the start-up zone, the throttle valve is the master and the turbocharger cannot be enabled, in the part-load zone, the turbocharger is in action, the throttle pedal position is short of the predetermined position, the intake manifold pressure is below 1000 mbar and the heat exchange chamber pressure has values greater than 1000 mbar and ranging up to 1800 mbar, and the throttle valve partially opens so that a pressure difference is created between the intake manifold and the heat exchange chamber to provide the power reserve such that depressing the throttle pedal, into the wide open position, supercharges the engine without delay by the intake manifold pressure and the heat exchange chamber pressure equalizing, and in the full-load zone, the throttle pedal is beyond the predetermined position and the pressure in the intake manifold ranges up to 1800 mbar, and the turbocharger is the master.

* * * * *